United States Patent
Lasagni

(10) Patent No.: US 9,233,435 B2
(45) Date of Patent: Jan. 12, 2016

(54) APPARATUS AND METHOD FOR THE INTERFERENCE PATTERNING OF PLANAR SAMPLES

(71) Applicant: Fraunhofer-Gesellschaft zur Foerderung der angewandten Forschung e.V., Munich (DE)

(72) Inventor: Andres Fabian Lasagni, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 492 days.

(21) Appl. No.: 13/684,915

(22) Filed: Nov. 26, 2012

(65) Prior Publication Data

US 2013/0153553 A1 Jun. 20, 2013

(30) Foreign Application Priority Data

Nov. 24, 2011 (DE) .......................... 10 2011 119 764

(51) Int. Cl.
| | |
|---|---|
| *B23K 26/36* | (2014.01) |
| *B23K 26/00* | (2014.01) |
| *B23K 26/06* | (2014.01) |
| *B23K 26/067* | (2006.01) |
| *B23K 26/073* | (2006.01) |

(52) U.S. Cl.
CPC ............ *B23K 26/365* (2013.01); *B23K 26/0084* (2013.01); *B23K 26/0604* (2013.01); *B23K 26/0676* (2013.01); *B23K 26/073* (2013.01)

(58) Field of Classification Search
CPC ........... B23K 26/0084; B23K 26/0604; B23K 26/365; B23K 26/073; B23K 26/0676
USPC .............. 219/121.68, 121.69, 121.7, 121.73, 219/121.74; 359/10, 280, 507, 577; 355/53, 355/55, 67
See application file for complete search history.

(56) References Cited

U.S. PATENT DOCUMENTS

| | | | | |
|---|---|---|---|---|
| 5,534,970 | A * | 7/1996 | Nakashima et al. | ............ 355/53 |
| 6,304,318 | B1 * | 10/2001 | Matsumoto | ..................... 355/55 |
| 2003/0035219 | A1 | 2/2003 | Tanaka | |

(Continued)

FOREIGN PATENT DOCUMENTS

| | | |
|---|---|---|
| JP | 2006-110587 A | 4/2006 |
| WO | WO 2011/072663 A2 | 6/2011 |

OTHER PUBLICATIONS

Kondo et al., "Femtosecond Laser Interface Technique With Diffractive Beam Splitter for Fabrication . . . ", Applied Physics Letters 79 (2001), 725-727.

Rizvi et al., "Production of Submicrometer Period Bragg Gratings in Optical Fibers Using Wavefront Division . . . ", Applied Physics Letters 67 (1995), 739-741.

(Continued)

*Primary Examiner* — Thien S Tran
(74) *Attorney, Agent, or Firm* — Jacobson Holman, PLLC.

(57) ABSTRACT

Apparatus for interference patterning of a planar sample including a laser and a focusing arrangement positioned in a beam path of the laser so that the laser beam is imaged in a first spatial direction in a focused manner into a sample volume in which the planar sample is positioned. An expanding and splitting arrangement is positioned downstream of the focusing arrangement for the laser beam, while maintaining the focused imaging in a first spatial direction which can be expanded in a second spatial direction, and which can be split into two partial beams. These two partial beams can be directed onto the sample volume.

13 Claims, 15 Drawing Sheets

(56) References Cited

U.S. PATENT DOCUMENTS

2004/0110092 A1* 6/2004 Lin .............................. 430/311
2011/0127697 A1* 6/2011 Milne ........................... 264/400

OTHER PUBLICATIONS

Sidharthan et al., "Periodic Patterning Using Multi-facet Prism-based Laser Interference Lithography", Laser Physics 19 (2009), 505-510.

* cited by examiner

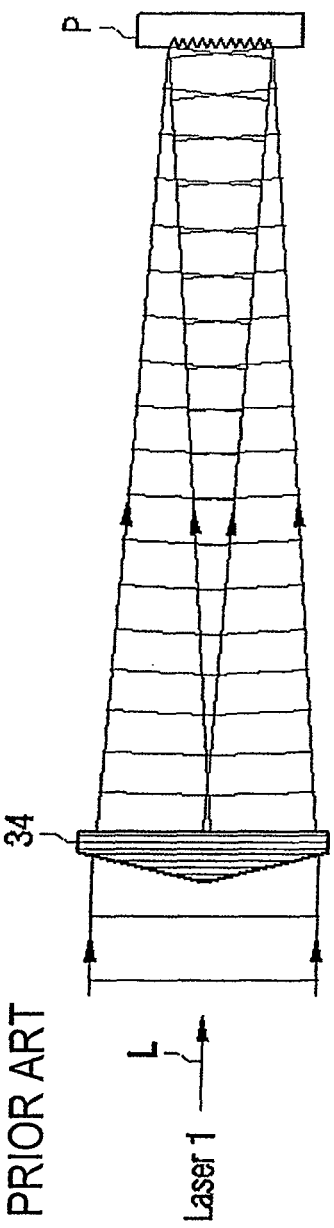
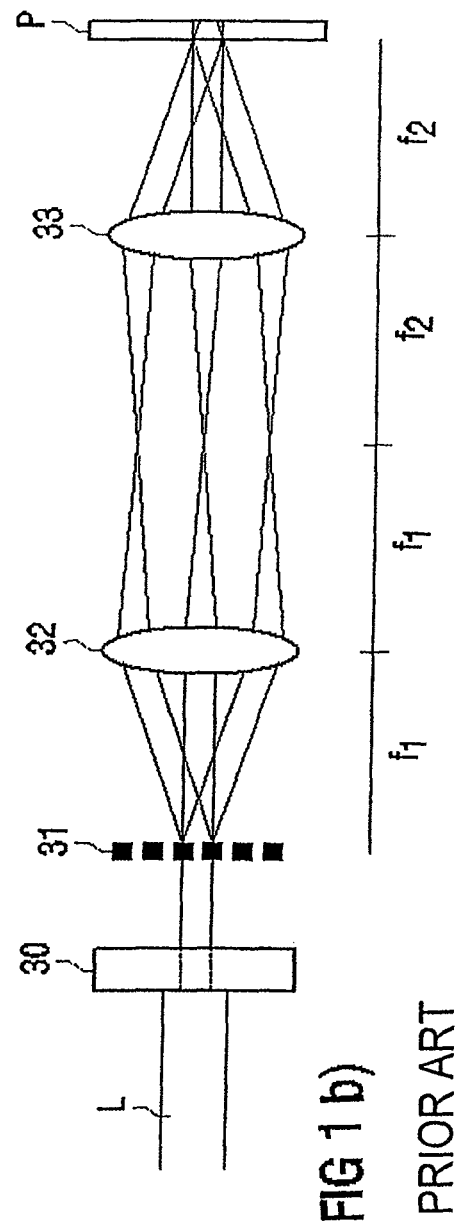
FIG 1 a) PRIOR ART
FIG 1 b) PRIOR ART

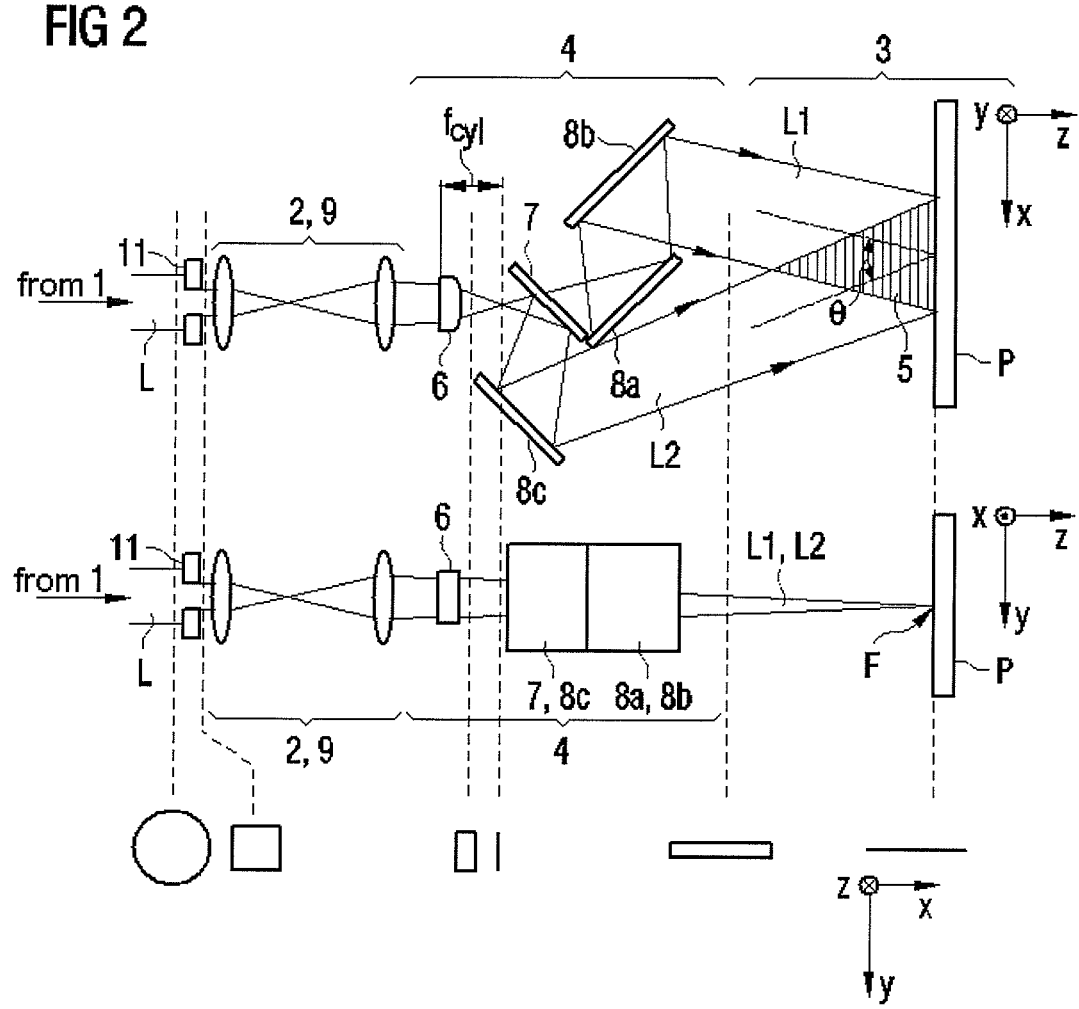

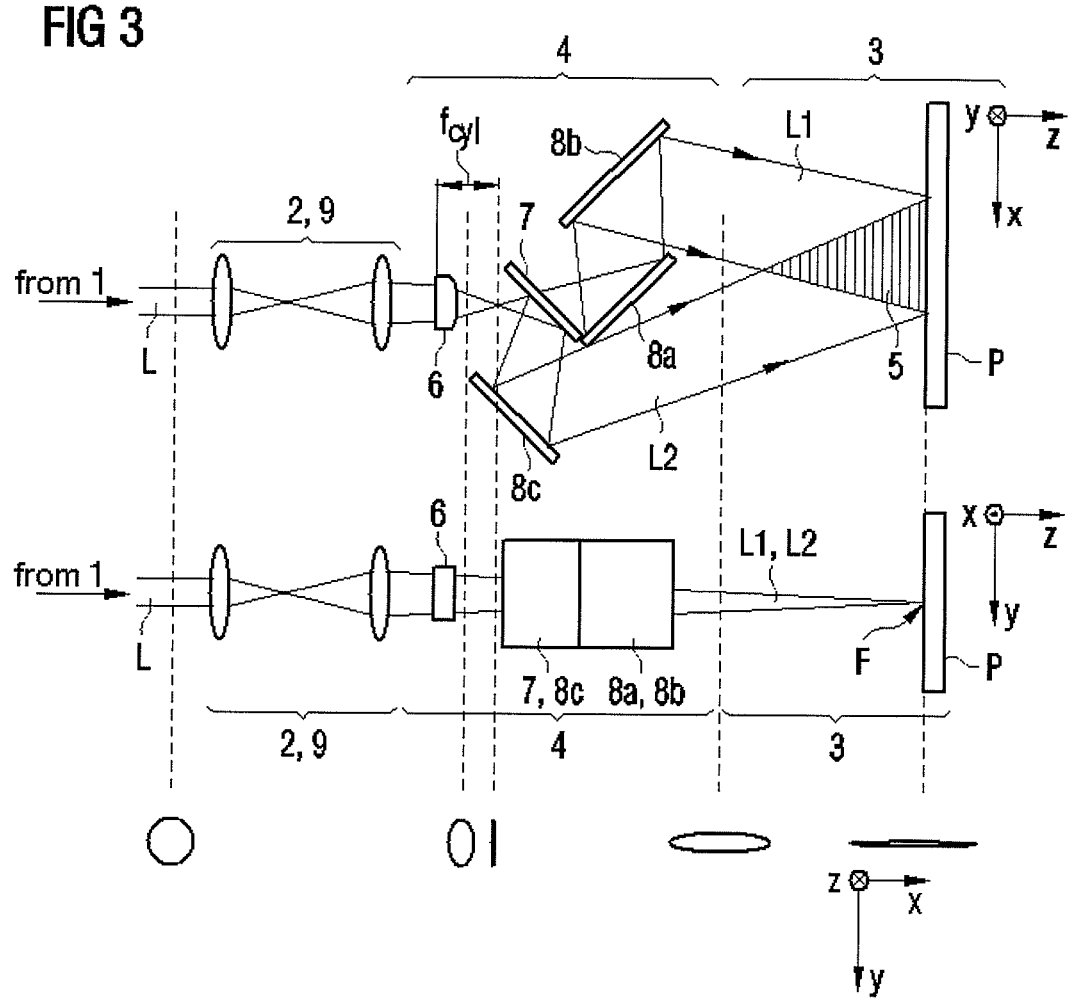

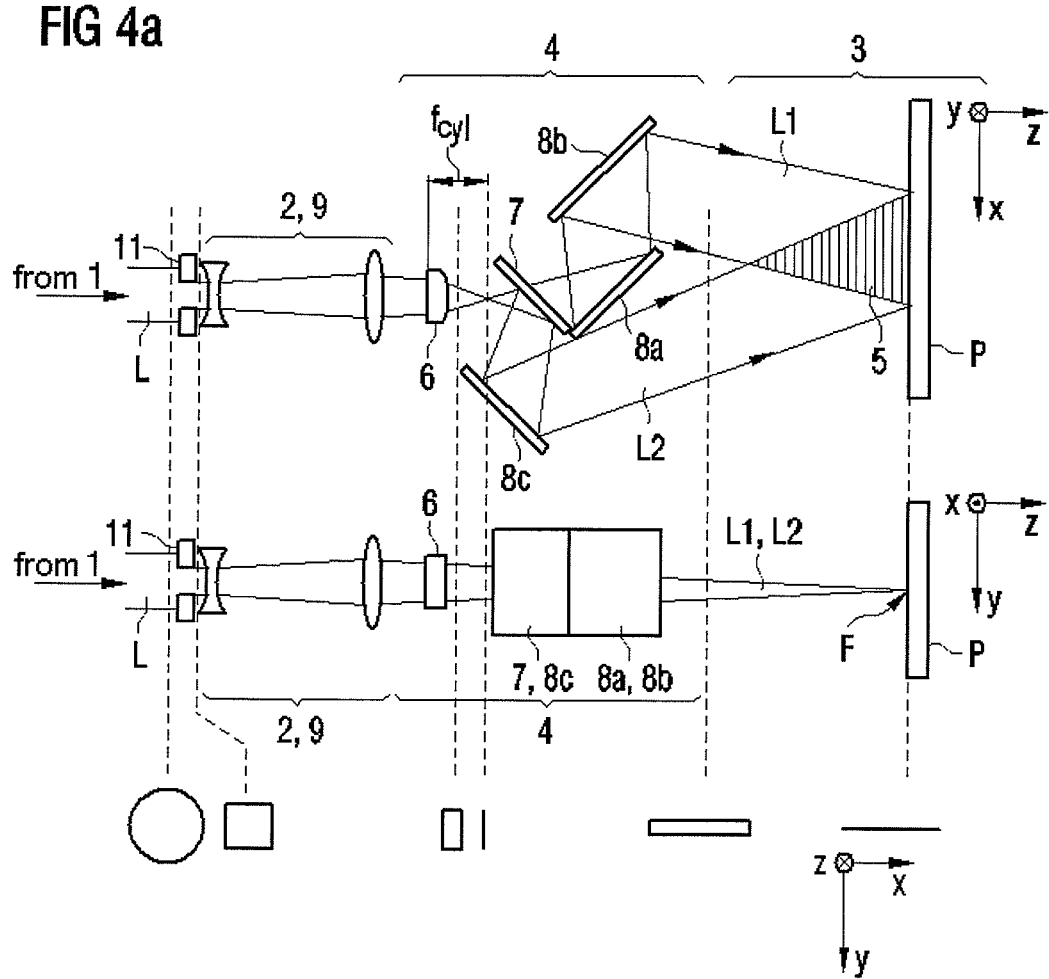

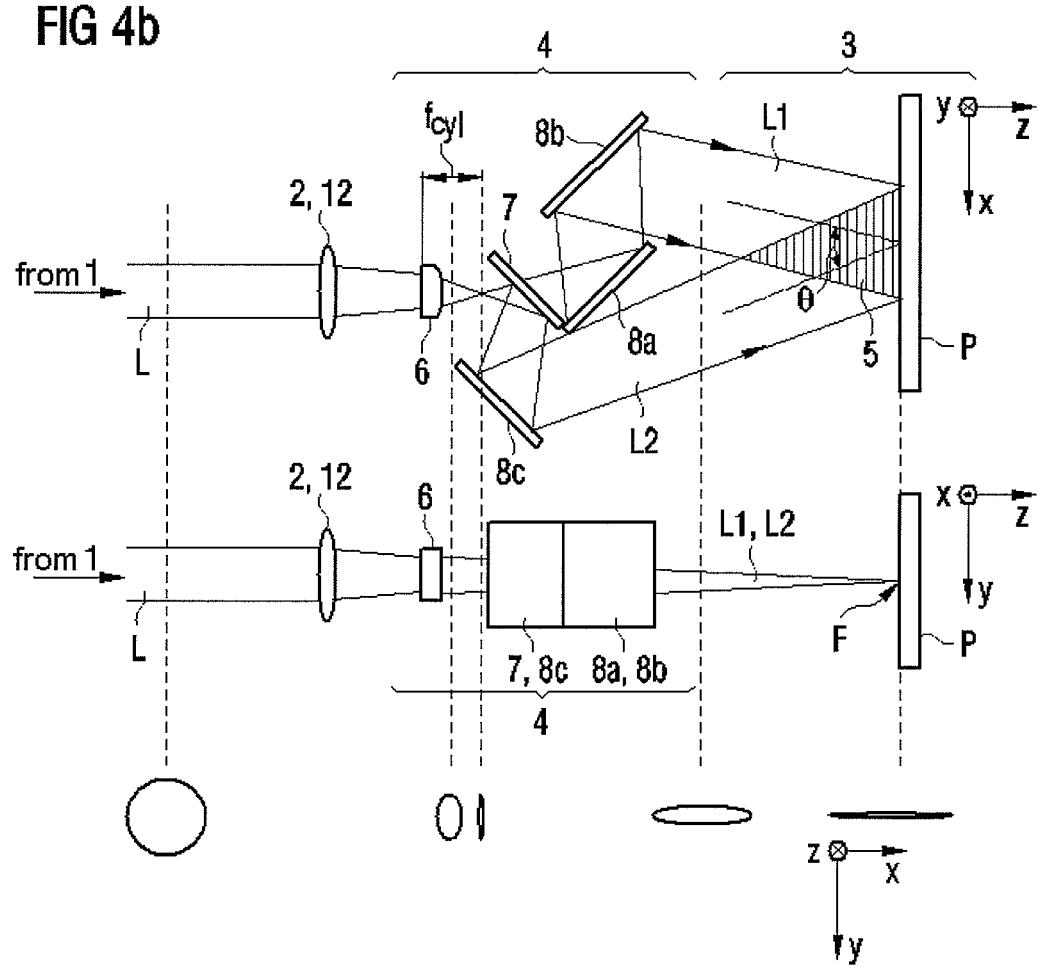

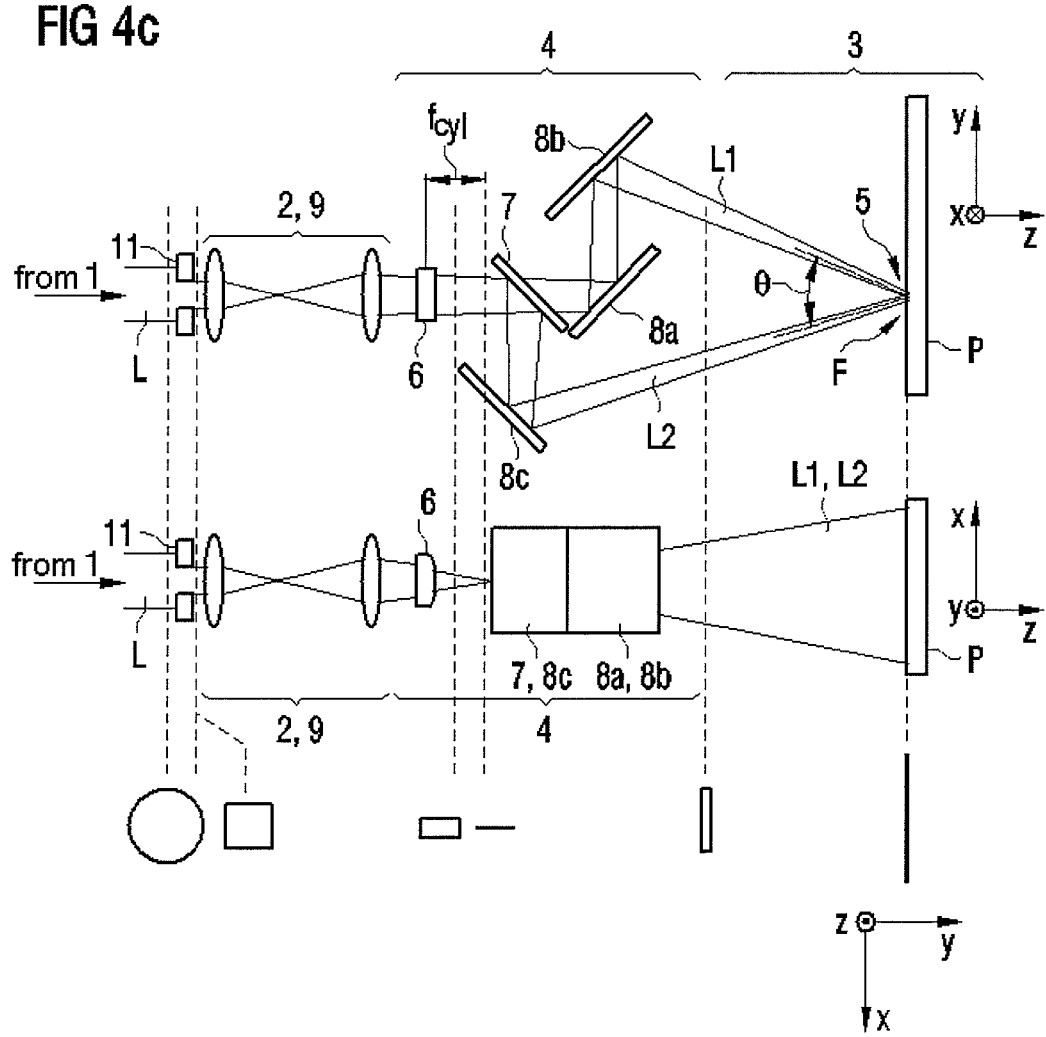

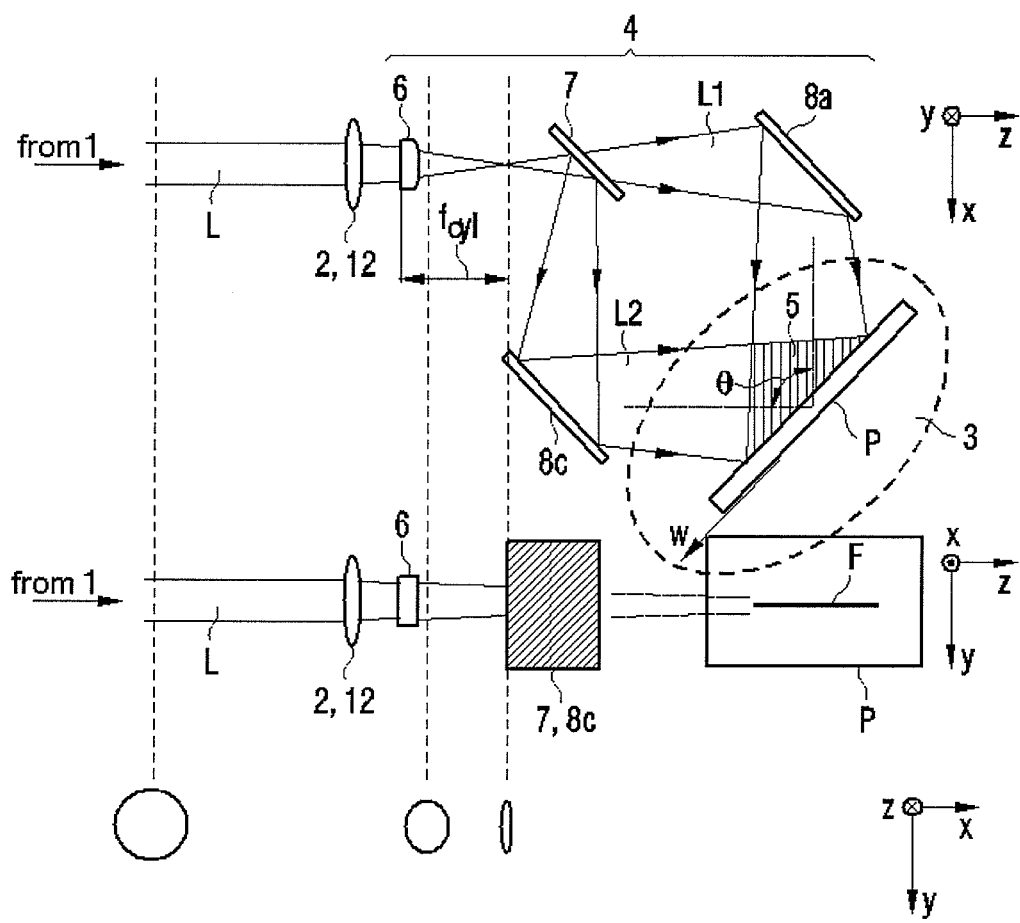

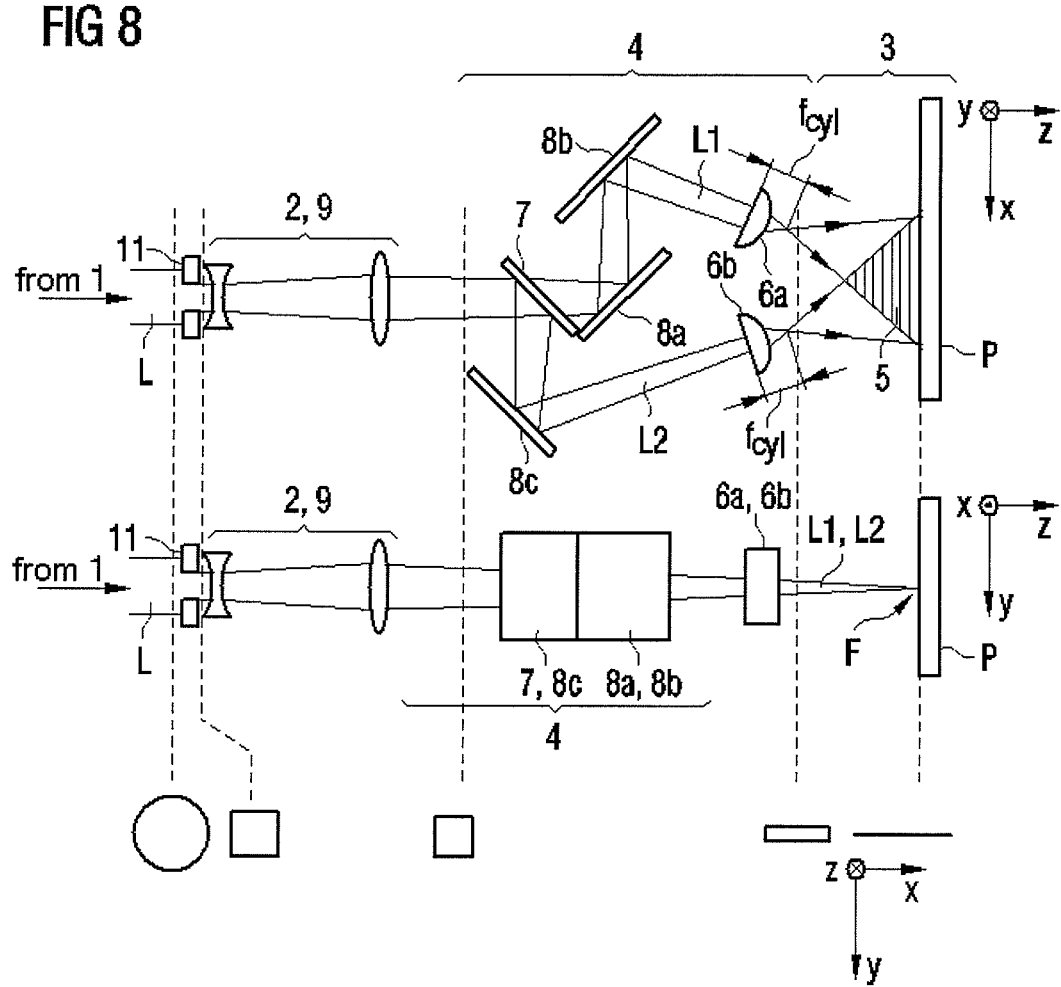

FIG 9a
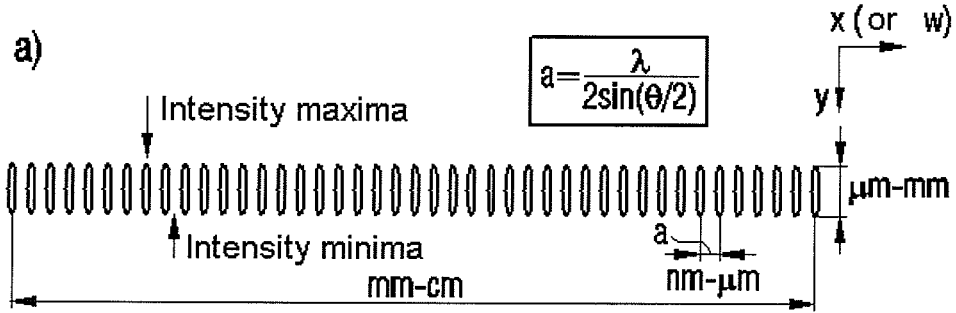
a)
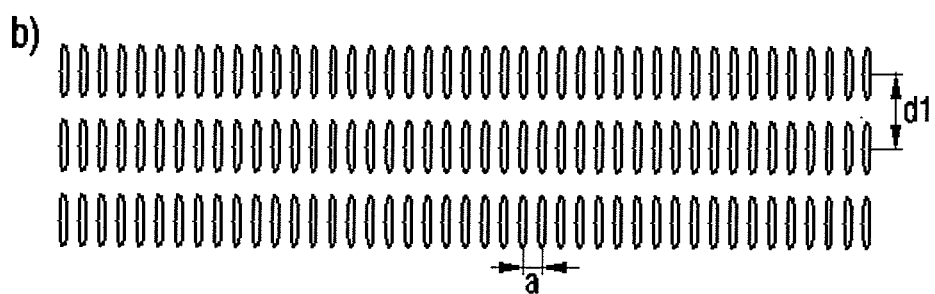
b)
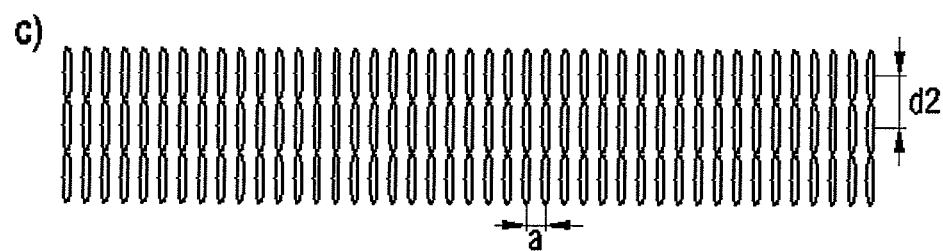
c)
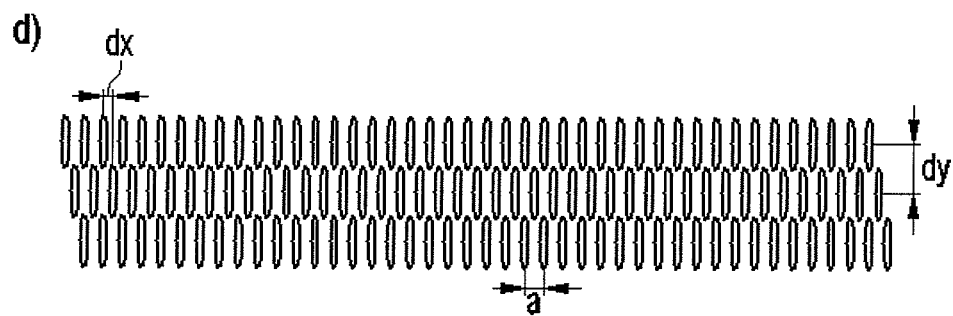
d)

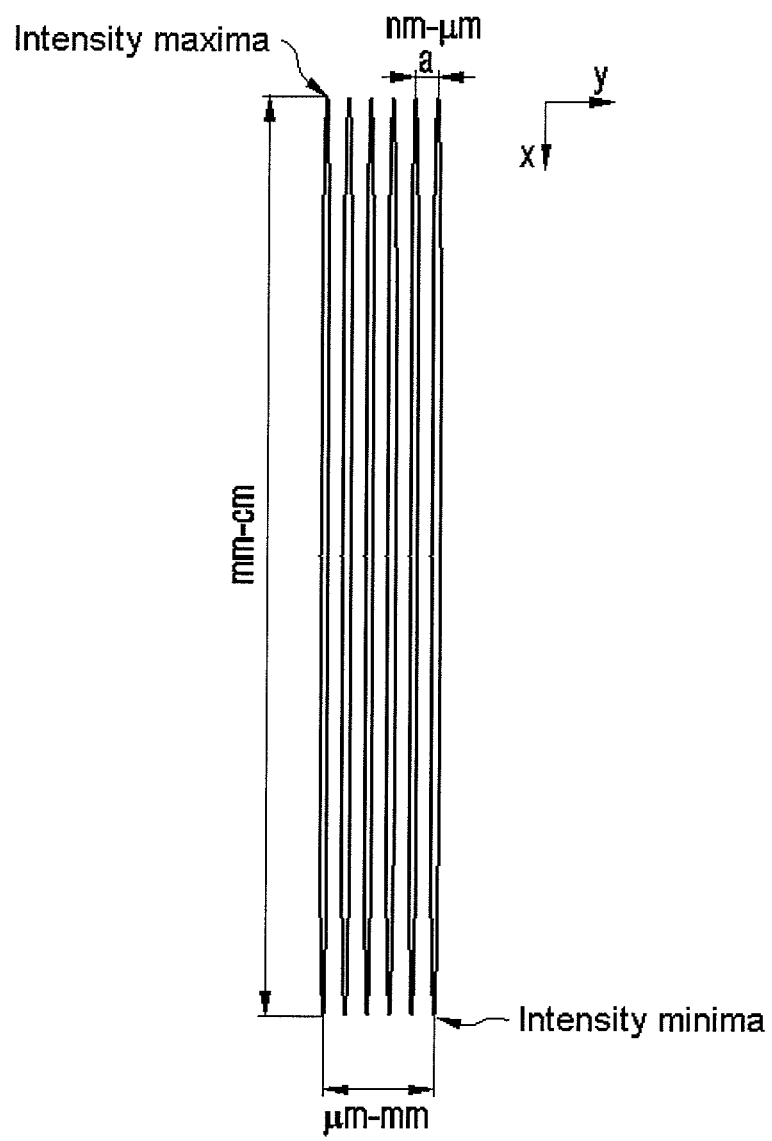

FIG 10
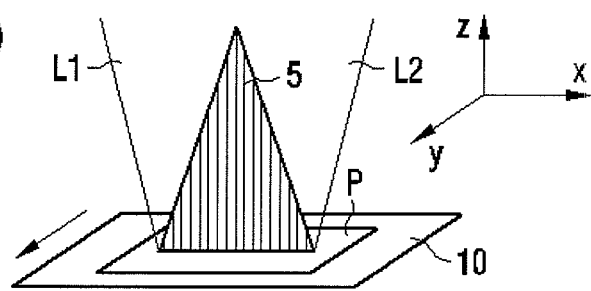
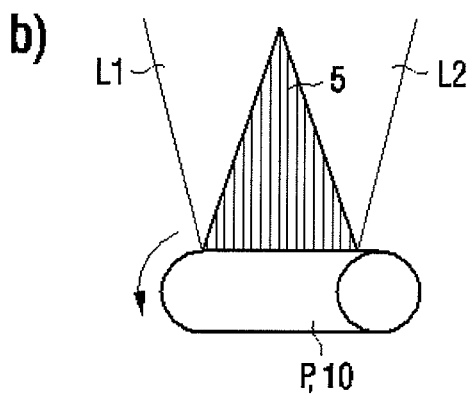
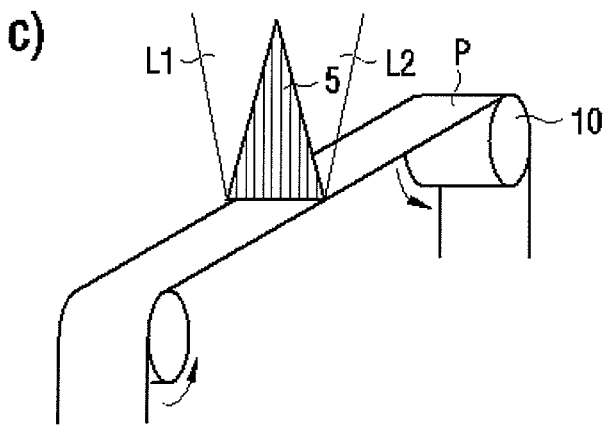

APPARATUS AND METHOD FOR THE INTERFERENCE PATTERNING OF PLANAR SAMPLES

This application has a priority of German no. 2011 119 764.1 filed Nov. 24, 2011, hereby incorporated by reference.

The present invention relates to the patterning of planar samples by means of laser systems, in particular by means of fibre lasers and/or by means of laser systems having a high pulse frequency.

The prior art firstly discloses apparatuses and methods for interference patterning which operate on the basis of prisms: R. Sidharthan et al. "Periodic Patterning Using Multi-Facet Prism-Based Laser Interference Lithography", Laser Physics 19, 2009, pages 505 to 510 and N. Rizvi et al. "Production of Submicrometer Period Bragg Gratings in Optical Fibers Using Wavefront Division With a Bi-Prism and an Excemer Laser Source", Appl. Phys. Lett. 67 (6), 7, 739. A corresponding principle is shown schematically in FIG. 1a) (the impinging laser radiation L of the laser 1 is split with the aid of a biprism 34 into two partial beams, which are superimposed on the substrate P).

Secondly, the prior art discloses the use of diffractive optical elements (gratings), in order to bring about interference patterning of samples. See, for example, T. Kondo et al. "Femtosecond laser interference technique with diffractive beam splitter for fabrication of three-dimensional photonic crystals", Applied Physics Letters 79 (2001), 725-727. The corresponding principle is shown in FIG. 1b): the laser radiation L is homogenized with the aid of an iris diaphragm 30 and passed to the diffractive optical element 31 and the partial beams arising as a result of diffraction are imaged onto the sample P with the aid of a lens system 32, 33 for interference patterning.

The apparatuses and methods known from the prior art have the disadvantage, in particular, that the area which can be patterned per unit time is very limited. Moreover, said apparatuses require a comparatively long structural length and the prism-based apparatuses, in particular, have only little variability with regard to the possibilities for setting the interference structures.

Therefore, it is an object of the present invention, proceeding from the prior art, to provide apparatuses and methods for the laser interference patterning of planar samples with which even large planar samples can be patterned simply, reliably and with an increased processing speed. Furthermore, it is an object to provide apparatuses and methods which realize the interference patterning in a compact space and with high variability when setting the interference structures (e.g. setting the period thereof).

The present invention is described below firstly of all generally, then on the basis of a number of exemplary embodiments. The features or sequences of optical components realized in combination with one another in the individual exemplary embodiments, within the scope of the present invention, do not have to be realized in exactly the combinations or sequences occurring in the exemplary embodiments, but rather can also be realized differently. In particular, individual optical components from among those shown in the exemplary embodiments can also be omitted or also combined differently with the other optical components of the same or of a different exemplary embodiment. Moreover, each individual one of the features shown in the exemplary embodiments can already constitute by itself an improvement of the prior art.

The basic concept of the solution according to the invention is based on introducing different optical elements, in particular cylindrical lenses, beam splitters and mirrors, but also further lenses, polarisers, etc., into the laser radiation of a preferably pulsed laser, in order to enable very large beam expansion in one direction (up to approximately 20 to 40 cm). In this case, different combinations of the individual optical elements enable the desired deformation, splitting and orientation of the laser beam. In particular, advantageously one or a plurality of cylindrical lenses is/are used in the construction of the invention for beam expanding. It is also particularly advantageous to use a diaphragm which trims the (cross-sectionally Gaussian) laser beam at the margins and with which it is possible to produce a homogeneous or virtually homogeneous beam intensity over the beam cross section before the laser beam is directed onto the further optical elements of the apparatus according to the invention.

When mention is made below of an arrangement as part of the apparatus according to the invention, this arrangement can consist of one or else of a plurality of individual optical elements (mirrors, lenses, beam splitters, . . . ). The individual optical elements, too, can themselves in turn consist of a plurality of parts, that is to say be embodied in a multipartite fashion.

In order that in the region of the interference maxima of the laser radiation in the sample volume a material removal, a material melting, a phase transformation, a photopolymerization or some other local change in the chemical properties (that is to say a patterning) can take place at the sample, the energy density of the laser radiation that is present in the interference maxima at the location of the sample has to be chosen suitably, for example between 0.1 and 10 $J/cm^2$. This can be realized by a suitable choice of the laser and of the optical arrangements of the apparatus (in particular: achieving a smallest possible focus size in the direction of the first spatial direction in conjunction with the largest possible extent of the beam in the second spatial direction).

The individual optical elements of the apparatus according to the invention (in particular: the cylindrical lens(es), the beam splitter and the reflection elements or mirrors), can be displaceable relative to one another and/or embodied in a rotatable fashion, such that the parameters (in particular: the period) of the interference structures can be set variably depending on the properties of the laser used and/or of the sample to be patterned.

An apparatus according to the invention for the interference patterning of a planar sample (e.g. of a semiconductor substrate or of a film) comprises a laser, a focusing arrangement positioned in the beam path of the laser, and an expanding and splitting arrangement positioned downstream of the focusing arrangement in the beam path of the laser. By means of the focusing arrangement, the laser beam can be imaged in a first spatial direction in a focused manner into a sample volume in which the planar sample is positioned. By means of the expanding and splitting arrangement, the laser beam (whilst maintaining the focused imaging into the sample volume in the first spatial direction by the focusing arrangement) can be expanded in a second spatial direction (which is not identical to the first spatial direction and is preferably orthogonal to the first spatial direction) and furthermore can be split into two partial beams and can be directed in the form of these two partial beams onto the sample volume such that the two partial beams interfere within the sample volume in an interference region (in which the sample is then patterned and/or photopolymerized).

In a further advantageous embodiment, the focusing arrangement is embodied as a focusing arrangement which alters the beam cross section, that is to say that, by means of said focusing arrangement, the laser beam is not only imaged in the first spatial direction in a focused manner into the sample volume, but furthermore can also be altered with regard to its beam cross section. Preferably, such alteration is a preferably variable expanding of the beam cross section.

Preferably, the laser beam, by means of such a focusing arrangement, can be altered or expanded with regard to its beam cross section in two spatial directions, which are not parallel to one another, and are preferably orthogonal to one another, wherein these two spatial directions are preferably the first and the second spatial directions.

In a further advantageous configuration of the invention, the laser beam, by means of the focusing arrangement, is focused firstly also in a further spatial direction (which is preferably the second spatial direction), which does not coincide with the first spatial direction, such that it would also be imaged in this further spatial direction in a focused manner into the sample volume before this focusing of the laser beam in the further spatial direction is cancelled again in the further course of the beam path by means of the expanding and splitting arrangement, in order to enable the beam path to be expanded in the second spatial direction. With these modifications of the laser beam path in the further spatial direction, however, the focused imaging of the laser beam into the sample volume in the first spatial direction is maintained in each case.

The altering of the beam cross section (the beam cross section is preferably enlarged, but it can also be narrowed) by the focusing arrangement can be realized, for example, by virtue of said focusing arrangement containing a beam expander, preferably in the form of a telescope. In particular, it is advantageous to design this arrangement or the telescope such that the diameter of the laser beam can be set, that is to say increased (or else, if appropriate, decreased), in a variable manner, that is to say that the ratio of the beam diameter downstream and upstream of the focusing arrangement can be set to different values >1 (or else, if appropriate <1).

However, the focusing arrangement can also be embodied such that it does not alter the beam cross section. In the simplest case, such a focusing arrangement which does not alter the beam cross section is an individual converging lens.

The telescope is preferably embodied such that the beam path is firstly expanded (or narrowed) in two mutually orthogonal directions and the expanded (or narrowed) beam is then imaged, by means of, for example, a suitable converging lens of the telescope, preferably in these two mutually orthogonal directions in a focused manner onto the sample volume. A cylindrical lens is then arranged in the beam path downstream of the telescope, by means of which cylindrical lens the focusing in one of the two abovementioned directions is cancelled again, in order to enable the possibly renewed expanding by the expanding and splitting arrangement (which comprises the cylindrical lens). In this case, cancelling the focusing again is understood to mean that an optical element of the expanding and splitting arrangement in the beam path downstream of the focusing arrangement ensures that the beam path in the further (preferably the second) spatial direction loses its focused property again, by virtue of the beam being defocused again by means of a concave cylindrical lens (diverging lens), for example, for the purpose of expanding the beam in this direction, or by virtue of the fact that, by means of a convex cylindrical lens (converging lens), the beam is firstly focused to an even greater extent in this direction, but an expansion is obtained by choosing the focal length of the convex cylindrical lens to be significantly less than half of the beam distance with respect to the sample volume situated in the beam path downstream of the convex cylindrical lens.

According to the invention, the beam path is preferably firstly expanded once by a beam-cross-section-altering focusing arrangement before it is expanded a second time again in the second spatial direction by means of the expanding and splitting arrangement. Consequently, according to the invention, in the second spatial direction, long sections (up to 20 to 40 cm) of the sample can be covered by the interference structure for sample processing. If the sample is then moved (for example with the aid of a transport belt or a roll-to-roll transport unit) at high speed relative to the apparatus according to the invention and perpendicularly to the second spatial direction (that is to say generally in the first spatial direction), then large sample sections (up to 1 m$^2$/s) can be processed per unit time according to the invention.

Advantageously, the laser beam, by means of the focusing arrangement, can be cross-sectionally altered (preferably expanded) in two spatial directions, which are not parallel to one another, and are preferably orthogonal to one another, which then preferably correspond to the first and second spatial directions.

Preferably, moreover, the laser beam, by means of the focusing arrangement, is firstly expanded in these two spatial directions which are not parallel to one another, before it is then focused in the first spatial direction and is imaged with this focusing into the sample volume.

The expanding and splitting arrangement preferably comprises at least one, preferably a plurality (or else all) of the following optical elements: one or a plurality of cylindrical lens(es) for expanding the laser beam or the two partial beams in the second spatial direction, a beam splitter (in particular a semitransparent mirror) for splitting the laser beam into the two partial beams, and/or one or a plurality of reflection element(s) (preferably embodied as plane mirrors), in order to direct the two partial beams onto the sample volume such that they interfere within the sample volume in the interference region.

Different sequences of the individual optical elements of the apparatus according to the invention are possible:

Thus, the expanding and splitting arrangement can comprise in the beam path firstly a first optical element in the form of a cylindrical lens, by means of which the renewed expanding is realized. In the beam path there then follows a second optical element in the form of a beam splitter, by means of which the laser beam is split into the two partial beams. Finally, there follow in the beam path third optical elements in the form of reflection elements (in particular: plane mirrors), in order to direct the two partial beams onto the sample volume in which they then interfere in the interference region.

In this case, the first optical element can be, in particular, a convex cylindrical lens which guides the beam path to the beam splitter, wherein then preferably the focal length of the convex cylindrical lens is less than the optical distance in the beam path between the cylindrical lens and the beam splitter and also the optical distance in the beam path between the cylindrical lens, on the one hand, and the location of the focus in the sample volume (this is taken to mean the focus in the first spatial direction), on the other hand, is greater than the focal length of the cylindrical lens by more than the factor 2 (preferably by a factor of at least 10).

However, the first optical element can also comprise a convex cylindrical lens and can preferably image the beam path onto the beam splitter such that the focal length of the cylindrical lens is greater than the optical distance in the beam path between the cylindrical lens and the beam splitter (in this case, the focus of the cylindrical lens then lies behind the beam splitter, whereas in the case described above it lies in front of the beam splitter). In this case, too, the optical distance in the beam path between the cylindrical lens, on the one hand, and the focus in the first spatial direction in the sample volume, on the other hand, can then be greater than the focal length of the cylindrical lens by at least the factor 2.

In a third possibility, however, the first optical element can also comprise a concave cylindrical lens: in this case, the beam, already expanded in accordance with the properties of the diverging cylindrical lens used, is passed to the beam splitter as second optical element, before it is then expanded to an even greater extent through the further optical distance to the sample volume.

As an alternative to the above-described optical arrangements of the apparatus according to the invention, it is also possible, however, for the expanding and splitting arrangement to comprise in the beam path firstly a first optical element in the form of a beam splitter, such that firstly the laser beam is split into the two partial beams. In the beam path thereafter there then follow a plurality of reflection elements (in particular: plane mirrors) as second optical elements, in order to direct the two partial beams onto the sample volume such that they interfere within the latter in the interference region. The direction of incidence leading to interference is already provided for the two partial beams if the third optical elements in the form of cylindrical lenses finally follow in the beam path of these two partial beams and then bring about the renewed expanding of the beam path in each of the partial beam paths. In this case, it should be taken into consideration that the indication of the expanding according to the invention in the second spatial direction can relate to the orientation of the surface of the sample, such that this wording does not rule out expansion of two partial beams impinging on the sample with different directions of incidence.

The two third optical elements can be convex cylindrical lenses which each image one of the two partial beams into the sample volume. For both cylindrical lenses, here the focal length can in each case be less than the optical distance in the respective partial beam path between the cylindrical lens of the partial beam path, on the one hand, and the location of the focus in the sample volume (this is taken to mean the focusing in the first spatial direction), on the other hand, by more than the factor 2 (preferably also by a significantly higher factor).

As an alternative thereto, the two third optical elements can, however, also be concave cylindrical lenses which image in each case one of the two partial beams directly in an expanded manner (i.e. without previous focusing and renewed defocusing) into the sample volume.

Preferably, an apparatus according to the invention additionally comprises a movement unit (for example a conveyor belt or a roller-based transport apparatus), by means of which the sample or at least sections thereof can be moved in the sample volume or through the sample volume. In this case, the movement is preferably effected perpendicularly to the expanding direction (that is to say to the second spatial direction), that is to say generally in the first spatial direction. This has the advantage that the apparatus for interference patterning (for example in a processing head) can be realized compactly, that is to say with comparatively small external dimensions. If the exemplary embodiments described below are realized in this form, then the individual optical elements of the arrangement, during the processing of the sample, are arranged fixedly in the Cartesian world coordinate system x, y, z (in this case, y is chosen as the first spatial direction, x or the coordinate or direction w lying in the xz plane forms the second spatial direction) and the sample P is moved relative to this world coordinate system.

As an alternative thereto, however, it is also possible to move the laser beam or the two partial beams rather than the sample: for this purpose, the focusing arrangement and/or the expanding and splitting arrangement can be embodied (for example by means of translatable and/or rotatable reflection elements, beam splitters and/or lenses in a suitable galvano scanner configuration) such that the two partial beams are deflected relative to the planar sample arranged in a stationary manner as seen in the world coordinate system.

In particular the variant of the stationary apparatus with the sample moved relative thereto is suitable for integration into a production installation or production line.

Pulsed lasers which can emit in the ultraviolet range, invisible range or else in the infrared range are preferably used according to the invention. By way of example, it is possible to use an Nd:YAG laser having a wavelength of 355 nm, a pulse energy of 1 mJ, a pulse frequency of 20 kHz and a pulse half-width of 8 ns.

The present invention thus describes the construction of an apparatus or of an optical system for generating one- or two-dimensional interference patterns for the direct patterning of different sample materials.

In comparison with the patterning systems from the prior art, the present invention enables simple and fast patterning of long substrates, such as, for example, films, e.g. in a roll-to-roll configuration. Consequently, in comparison with the prior art, in particular it is also possible to reduce the number of linear tables required for moving the sample, because the extent of the laser beam on the substrate (where the partial beams interfere) can be greater than or equal to the extent of the sample to be processed (such that, if appropriate lateral displacement of the beam or sample can be dispensed with).

Depending on the maximum pulse energy of the laser system used (the apparatus can also be designed for the flexible use of different laser systems or for interchanging the latter), the shape of the laser beam and also the angle $\Theta$ of incidence (cf. below) of the two partial beams can be set in a variable manner, such that the necessary energy for patterning can be chosen in a variable manner depending on the surface to be processed. A very large extent of the incident radiation in a projection direction (second spatial direction) can be achieved here in any case. Consequently, it is possible to obtain a high laser energy per area; at the same time, the patterning of large substrates can be carried out using only one direction of movement.

By means of a first expanding step (in a beam-cross-section-expanding focusing arrangement, in particular in a corresponding telescope), a high flexibility for different laser systems can be achieved by means of the present invention, e.g. by varying the distance between two lenses in the telescope, i.e. the apparatus according to the invention can be adapted to the laser used, before a very large extent of the laser beam bundle in the second spatial direction can then be achieved in a second expanding step (by means of the expanding and splitting arrangement).

In comparison with the prism constructions known from the prior art, the present invention has the advantage, in particular, that the angle $\Theta$ of incidence of the two partial beams that is crucial for the period of the structure to be obtained is practically freely selectable. In order to obtain a comparable extent in the second spatial direction of 20 to 40 cm, very large (and heavy, only producible with very high outlay) prisms would be necessary, moreover, which would in turn necessitate a long structural length. By contrast, the present invention thus has the advantage that the corresponding processing is possible more expediently and with a more compact construction.

On account of a homogenization of the laser beam owing to the high level of focusing in one direction (first spatial direction), a high aesthetic appeal of the patterned components is also possible according to the invention, such that the invention can in particular also be used for the patterning of decorative elements (cf. FIG. 11). The invention thus makes it possible to pattern a wide variety of materials, such that the invention can be applied in the field of tribology, optics, mechanics and the processing of biological samples. In particular, large substrates (for example solar cells and OLEDs) can be patterned with comparatively little outlay and rapidly, integration of the apparatus according to the invention into inline operation readily being possible. Since the extent of the laser beam is very large in the second spatial direction, compact optical workheads can be developed which are fixed on processing stations.

The present invention is described below on the basis of a number of exemplary embodiments. In this case, in the figures:

FIGS. 1a and 1b show patterning methods according to the prior art.

FIG. 2 shows a first apparatus according to the invention.

FIG. 3 shows a second apparatus according to the invention.

FIG. 4a shows a third apparatus according to the invention.

FIG. 4b shows a fourth apparatus according to the invention.

FIG. 4c shows a fifth apparatus according to the invention.

FIG. 5b shows a seventh apparatus according to the invention.

FIG. 8 shows a tenth apparatus according to the invention.

FIGS. 9a and 9b show interference structures that can be obtained by means of the apparatus according to the invention.

FIG. 10 shows the use of the apparatuses according to the invention in the inline operation of various production lines.

Various concrete exemplary embodiments of the apparatus according to the invention are shown in the following FIGS. 2 to 8. The apparatuses are arranged here in each case in a positionally fixed manner in the Cartesian world coordinate system x, y, z, wherein the y-direction is the first spatial direction, in which the laser beam L is imaged in a focused manner into the sample volume 3. The sample P is moved in each case in the first spatial direction y. If, in individual exemplary embodiments, the focusing arrangement is embodied as a focusing arrangement that alters the beam cross section (in particular: with the aid of a telescope), by means of which focusing arrangement a first expansion of the beam cross section can already be achieved, then the focusing arrangement in these cases is also designated as expanding and focusing arrangement 2.

Figure 5A:
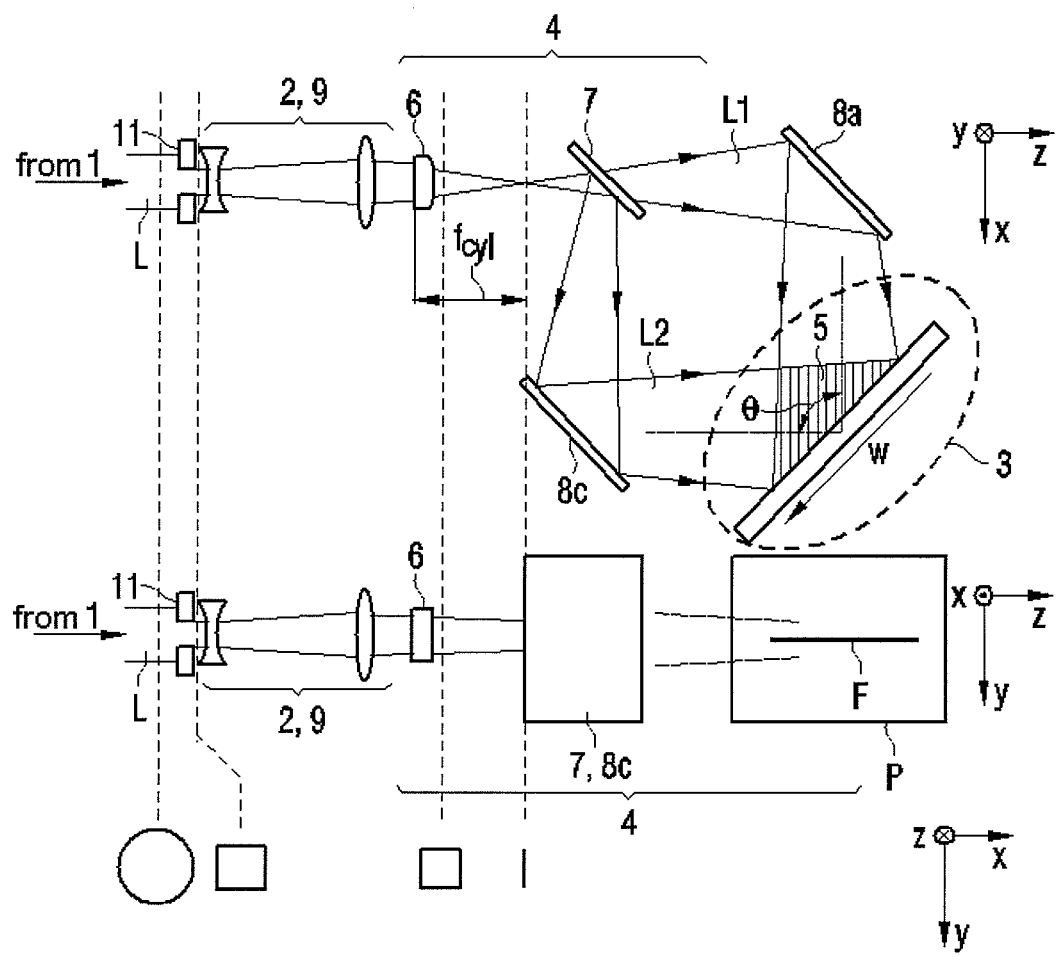
FIG. 5a shows a sixth apparatus according to the invention.

In the exemplary embodiments in FIGS. 2 to 4c and 6 to 8, the x-direction is that direction in which the laser beam is expanded in the expanding and splitting arrangement 4. In FIGS. 5a and 5b, the sample P or its surface to be processed (in contrast to FIGS. 2 to 4c and 6 to 8, where the sample P is arranged parallel to the xy plane) is arranged parallel to the y-direction, but in a manner tilted with respect to the xy plane, such that the second spatial direction w (parallel to the surface of the sample P) here is a direction which lies in the xz plane, that is to say a direction which lies perpendicular to the y-direction, but which does not correspond to the x-direction.

FIGS. 2 to 8 (with the exception of FIG. 4c) show for each of the exemplary embodiments in each case in three rows, from top to bottom, the arrangement of the individual elements of the apparatuses according to the invention and the planar sample P in a plane perpendicular to the first spatial direction y (first row) and in a plane parallel to the first spatial direction y (second row) and the beam cross section or the beam shape of the laser beam at different positions along the optical principal beam axis (z-direction) in the third row. The roles of the first and second rows are interchanged in FIG. 4c. In this case, in FIGS. 2 to 4c and 6 to 8, the optical principal axis z is oriented perpendicularly to the surface of the sample P.

In the first embodiment (FIG. 2), the laser beam L of a Q-switched, diode-pumped laser 1 (5 kHz, power 5 W, pulse duration 30 ns), not shown here, is firstly homogenized (trimming of the falling edge flanks of the substantially Gaussian beam profile) by means of a square diaphragm 11 (side length of the diaphragm aperture: 5 mm) and radiated onto a telescope 9 arranged in the beam path downstream of the diaphragm 11 as an expanding and focusing arrangement 2. The telescope 9 here comprises two converging lenses. By varying the distance between these two converging lenses along the principal beam direction z, it is possible to set the ratio of the side lengths of the square beam on the beam exit side of the telescope 9 and on the beam entrance side of the telescope 9 in a variable manner, and thus set the beam extent in the two directions x and y perpendicular to the direction z of incidence in a variable manner. The telescope 9 or the focal length of the converging lens on the exit side of the telescope is designed such that the expanded beam L on the beam exit side of the telescope is focused by the latter (taking account of the optical path lengths of the two partial beams L1 and L2 via the below-described further optical elements 6, 7, 8 in the beam path) both in the x-direction and in the y-direction onto the surface to be processed of the sample P arranged in the sample volume 3. The sample P can, however, also be arranged outside the focusing location in the sample volume 3.

In the beam path downstream of the telescope 9, a convex cylindrical lens 6 is arranged with its focusing axis along the first spatial direction y, that is to say such that the laser beam L that has already been focused in the two directions x and y is focused anew in the second spatial direction x (the focusing in the first spatial direction y being maintained as a result of this orientation of the longitudinal axis of the cylindrical lens 6). In this case, the focal length $f_{cyl}$ of the cylindrical lens 6 is chosen such that for both partial beams (see L1 and L2 hereinafter) the ratio of the optical path length from the cylindrical lens 6 to the sample surface to be processed of the sample P, on the one hand, and the focal length $f_{cyl}$, on the other hand, is significantly greater than 2, here approximately 12.

A semitransparent mirror 7 (beam splitter) is arranged approximately at a distance of 1.5 times the focal length $f_{cyl}$ in the beam path downstream of the cylindrical lens, by means of which mirror the beam path L of the laser is split between two partial beams L1 and L2. The cylindrical lens 6 thus images the laser beam L onto the semitransparent mirror 7 such that the focal point of the cylindrical lens, as seen in the beam direction, lies upstream of the semitransparent mirror 7.

The transmitted partial beam path L1 of the semitransparent mirror 7 is reflected at a first plane mirror 8a, is incident on a second plane mirror 8b and from there is radiated into the sample volume 3 in which the sample P to be processed is arranged. The partial beam path L2 reflected at the semitransparent mirror 7 is incident on a third plane mirror 8c and from there is directed into the sample volume 3 or onto the surface to be processed of the sample P. The semitransparent mirror 7

(beam splitter) and the three plane mirrors 8a to 8c are in this case positioned and oriented in the position space x, y, z such that the two partial beams L1 and L2 are incident at an angle Θ>0° (here e.g. 30°) in an interfering manner on the surface to be processed of the sample P. Consequently, the sample surface is patterned in the plane of intersection between the interference region (5) and the sample (P). The two partial beam paths L1 and L2 here are—relative to the respective central rays—of the same length from the mirror 7 to the surface of the sample P (this need not be the case, however).

As a result of the first expansion by means of the telescope 9 in the x- and y-directions and also as a result of the further expansion by means of the cylindrical lens 6 in the x-direction on account of the very much shorter focal length $f_{cyl}$ of the lens 6 in comparison with the total optical path length downstream of said lens 6, an expansion in the x-direction to approximately 10 cm is effected, whilst maintaining the focusing of the laser beam L or L1, L2 in the y-direction (cf. focus F in the middle row of the figure). This therefore results in a large interference region 5 in the sample volume 3, such that, as seen in the x-direction, a comparatively large section of the sample P can be processed all at once. Further transport of the sample P in the y-direction (not shown here) then enables the planar processing of the sample (also cf. FIG. 9).

The expanding and splitting arrangement 4 thus comprises the cylindrical lens 6, the semitransparent mirror 7 and also the reflection elements 8a, 8b and 8c.

In a variant of the embodiment from FIG. 2 (not shown), the construction is identical to the construction shown in FIG. 2 with the exception that the ratio of the focal length $f_{cyl}$ of the cylindrical lens to the optical path length from the cylindrical lens 6 to the semitransparent mirror 7 is greater than 1. In this case, the focusing of the laser radiation in the second spatial direction x, which focusing ultimately leads to the further expansion, is therefore effected in such a way that the focus of the cylindrical lens 6 lies downstream of the semitransparent mirror 7 in the beam path. However, since here as well the optical path length between the cylindrical lens 6 and the sample surface to be processed is greater than the focal length $f_{cyl}$ by the factor 5 or 10, for example, that is to say by significantly more than the factor 2, here as well a high level of expansion of the laser radiation in the second spatial direction x is achieved by means of the cylindrical lens 6 after focusing has been effected by means of the renewed defocusing. (If the path length in the two partial beam paths L1 and L2 is not identical, the optical path length between cylindrical lens 6 and sample surface P—as also in all the other embodiments—is taken to mean the average path length (L1+L2)/2.)

FIG. 3 shows a second embodiment according to the invention, which is designed basically like the embodiment shown in FIG. 2, and so only the differences will be described here. In FIG. 3, the square diaphragm 11 is omitted, such that the laser beam L of the laser 1 is imaged onto the telescope 9 without previously being trimmed. Here, too, the beam diameter can be set with the aid of the telescope (variation of the lens spacing in telescope 9). The advantage of the arrangement shown in FIG. 3 is the avoidance of intensity losses resulting from the trimming of the beam by the diaphragm 11. By contrast, the arrangement shown in FIG. 2 has the advantage that the intensity is practically constant over the entire beam cross section downstream of the diaphragm, thus resulting in a practically constant intensity after the optical imaging 9, 6, 7 and 8a to 8c over the entire extent of the interference region 5 in the sample volume in the x-direction. All regions of the sample P which are patterned by the interference are thus patterned in an identical manner (this avoids, for example, a smaller penetration depth of the structures towards the edge of the interference region 5, in comparison with the centre thereof).

The third embodiment of the invention, as shown in FIG. 4a, is also designed identically to the embodiment shown in FIG. 2, with only the difference described below: in FIG. 4a, instead of a telescope comprising two convex converging lenses, a telescope 9 is used in which firstly a concave diverging lens and then a convex converging lens are arranged in the beam path.

The fourth embodiment of the invention, as shown in FIG. 4b, is likewise designed identically to the embodiment shown in FIG. 2, with the exception of the differences described below: in FIG. 4b, in the same way as in FIG. 3, the diaphragm 11 is omitted. Moreover, in FIG. 4b, instead of the expanding and focusing arrangement 2 in the form of a telescope 9 as used in FIG. 2, a simple converging lens 12 is used as the focusing arrangement 2 (which does not alter the beam cross section). With the aid of this converging lens 12, therefore, the beam L of the laser 1 is imaged both in the first spatial direction y and in the second spatial direction x firstly in a focused manner into the sample volume 3 before the laser beam L focused in this way is passed to the cylindrical lens 6, by means of which, as described above, the focusing in the second spatial direction x is cancelled again for the purpose of expanding the beam path in the second spatial direction x (whilst maintaining the focused imaging in the first spatial direction y).

The fifth embodiment of the invention, as shown in FIG. 4c, is likewise designed identically to the embodiment shown in FIG. 2, with the exception of the orientation of the cylindrical lens 6 relative to the arrangement 7, 8a to 8c of the expanding and splitting arrangement 4. Consequently, in contrast to FIG. 2, where the longitudinal axis of the cylindrical lens 6 is oriented perpendicularly to the plane (the x-z plane in FIG. 2) spanned by the two partial beams L1 and L2, here said longitudinal axis is parallel to the plane spanned by the two partial beams L1 and L2 (or the central rays thereof, cf. the dashed lines in FIG. 4c). The angle at which the two partial beams L1 and L2 interfere is likewise designated by Θ here. Consequently, the expansion of the laser beam L or of the two partial beams L1 and L2 is effected here perpendicularly to the plane (the y-z plane) spanned by the two partial beams L1 and L2, that is to say in the x-z plane, cf. FIG. 4c, middle row. (With regard to the shape of the interference structures thus generated, cf. FIG. 9b.)

The embodiment shown in FIG. 5a is also basically identical in its construction to the embodiment shown in FIG. 2, and so once again only the differences will be described. In the embodiment shown in FIG. 5a, the beam guiding downstream of the semitransparent mirror 7 of the expanding and splitting arrangement 4 is effected on the basis of only two reflection mirrors 8a and 8c; the third reflection mirror 8b in the first partial beam path L1 is omitted. In each of the two partial beam paths L1 and L2, the corresponding partial beam is therefore deflected by means of exactly one reflection mirror 8 by 90° here (other angles are also possible), before the respective partial beam impinges on the surface to be processed of the sample P. Consequently, the two partial beams L1 and L2 here are incident on the sample surface relative to one another at an intersection angle of Θ=90° (the angle here, as also in the other exemplary embodiments, relates to the principal beam axis in the respective partial beam path). The sample surface P here is oriented parallel to the first spatial direction y but—in comparison with the case shown in FIG. 2—now is no longer parallel to the xy plane, but rather tilted by e.g. 45° with respect thereto. Consequently, the second spatial direction w, in which the maximum expansion is achieved here in the interference region 5, here is indeed still perpendicular to the first spatial direction y, but is now rotated by e.g. 45° about said first spatial direction y relative to the x-axis in the anticlockwise direction.

The embodiment shown in FIG. 5b is basically identical to the embodiment shown in FIG. 5a, with the exception of the focusing arrangement 2 used: instead of the expanding and focusing arrangement 2 in the form of a telescope 9 as used in FIG. 5a, by means of which arrangement a first beam expansion is already realized, a simple converging lens 12 is arranged in the beam path L upstream of the cylindrical lens 6 in FIG. 5b, by means of which converging lens the laser beam L is firstly imaged in a focused manner in the two spatial directions y and w, before the focusing in the second spatial direction w is then cancelled again by the cylindrical lens 6 for the purpose of expanding the beam path L for the first time. Consequently, in FIG. 5b—in contrast to the expansion twice by the telescope 9 and the beam guiding downstream of the cylindrical lens 6 in FIG. 5a—there is only a single expansion of the beam path by the beam guiding downstream of the cylindrical lens 6.

Figure 6:
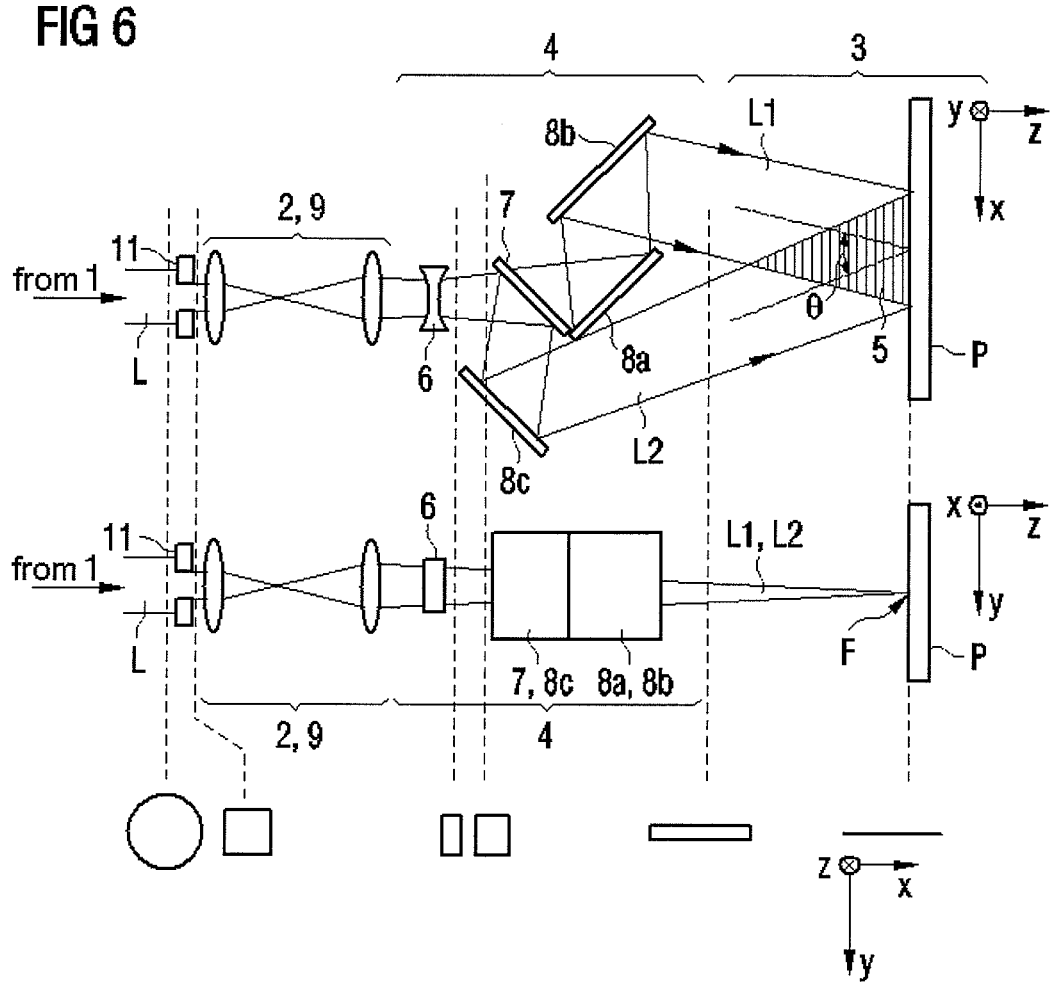
FIG. 6 shows a eighth apparatus according to the invention.

The eighth embodiment of the invention, as shown in FIG. 6, is basically designed like the embodiment shown in FIG. 2, and so once again only the differences will be described. Instead of the convex cylindrical lens 6 in the beam path between the telescope 9 and the semitransparent mirror 7, the expanding and splitting arrangement 4 in this exemplary embodiment has, at the position of said cylindrical lens, a here concave, that is to say diverging, cylindrical lens 6. Consequently, the further expansion of the beam L in the second spatial direction x (whilst maintaining the focusing F in the first spatial direction y) is effected here by the diverging properties of the lens 6, wherein the degree of renewed expansion or the extent of the partial beams L1 and L2 in the interference region 5 in the x-direction can be set by the focal length of the lens 6. The greater the defocusing by the lens 6, the greater the beam expansion in the second spatial direction x at the location of sample processing (with the optical distance between lens 6 and sample P being kept constant). By suitably displacing the two reflection mirrors 8b and 8c counter to the second spatial direction x and respectively in the second spatial direction x (and correspondingly changing the tilting angle of the mirrors relative to the xy plane), it is possible in a simple manner—as also in the other embodiments—to vary the interference angle Θ and thus the period a of the interference structures applied (cf. FIG. 9).

Here, as also in the other exemplary embodiments, the distance between the lenses in the telescope 9 (if present), the focal length of the cylindrical lens(es) 6 (or 6a, 6b, cf. below) and the optical path lengths in the two partial beams L1 and L2 are crucial for the extent of the expansion in the second spatial direction or for the ratio of the extents of the laser beam in the second spatial direction and in the first (focused) spatial direction. By suitably varying the corresponding parameters, it is possible to set the desired expansion in the second spatial direction (together with the angle Θ by displacing or rotating the mirrors 8a, 8b, 8c) in a simple manner.

Two further exemplary embodiments (ninth and tenth embodiments of the invention) are described below, in which the further expansion in the second spatial direction x is effected on the basis of two cylindrical lenses 6a and 6b. In this case, the basic constructions of the two embodiments are as in the case of the exemplary embodiment shown in FIG. 2, and so once again only the differences will in each case be described below.

Both embodiments use an alternative expanding and splitting arrangement 4, in which, in the beam path downstream of the telescope 9, firstly there follows the semitransparent mirror 7, before the transmitted partial beam path L1 is deflected via the two reflection mirrors 8a and 8b, on the one hand, and the reflected partial beam path L2 is deflected by means of the third reflection mirror 8c, on the other hand, in order to realize the interference at the interference angle Θ>0 (here: 35°) in the interference region 5 or on the sample surface P to be processed in the sample volume 3.

In contrast to the exemplary embodiments described previously, however, in the ninth embodiment in FIG. 7, in each case exactly one concave, that is to say diverging, cylindrical lens is arranged in each of the two partial beam paths L1 and L2 downstream of the reflection mirrors 8b (beam path L1) and 8c (beam path L2). The longitudinal axis of the cylindrical lens 6a in the beam path L1 and the longitudinal axis of the cylindrical lens 6b in the beam path L2 are here in each case oriented parallel to the first spatial direction y, such that these two beam paths L1 and L2 are expanded in the second spatial direction x. The degree of expansion at the sample surface P can be set virtually arbitrarily by means of the focal length of the cylindrical lenses 6a and 6b, which are designed identically here but are arranged, for the purpose of realizing the tilting angle Θ, in a manner tilted with respect to one another at precisely said angle, and also by means of the distance (in the two beam paths L1 and L2) between the respective cylindrical lenses and the sample surface.

Figure 7:
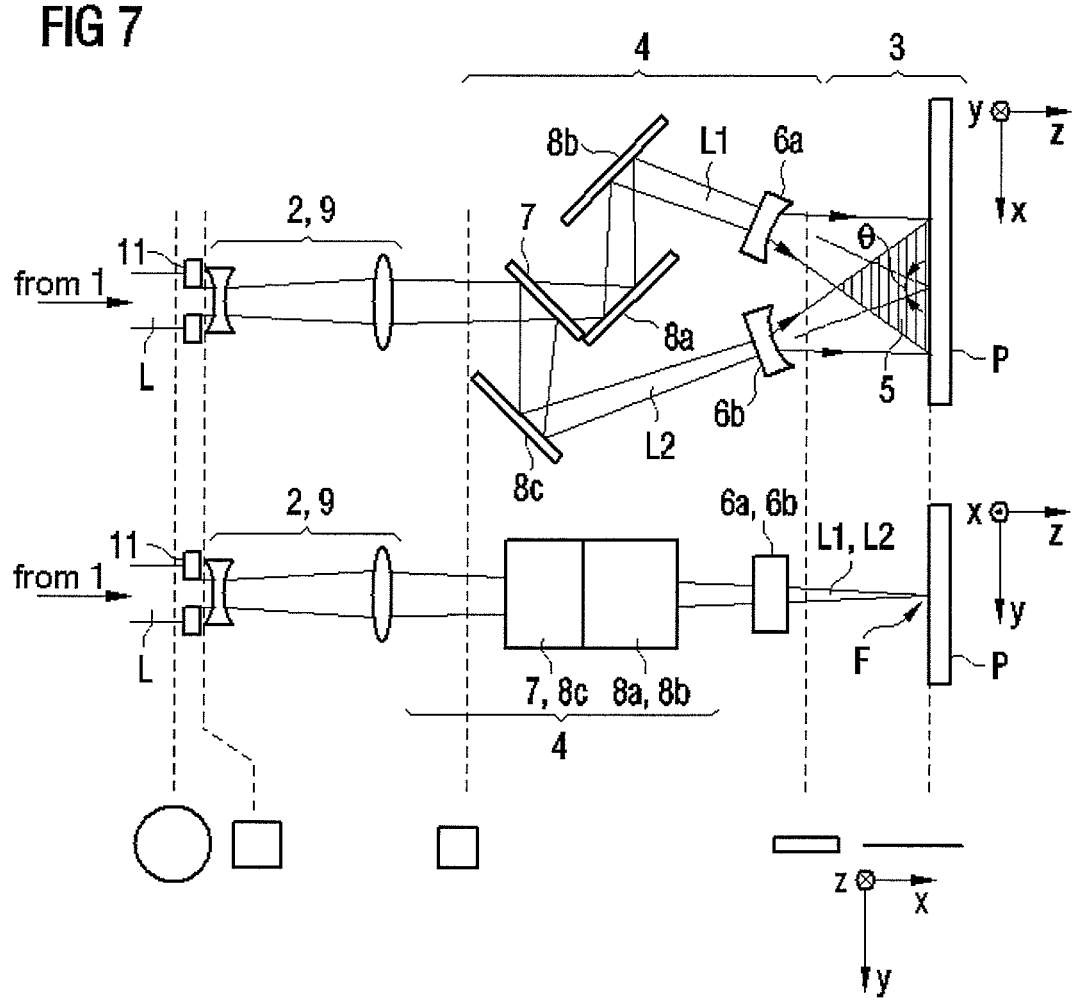
FIG. 7 shows a ninth apparatus according to the invention.
Figure 11:
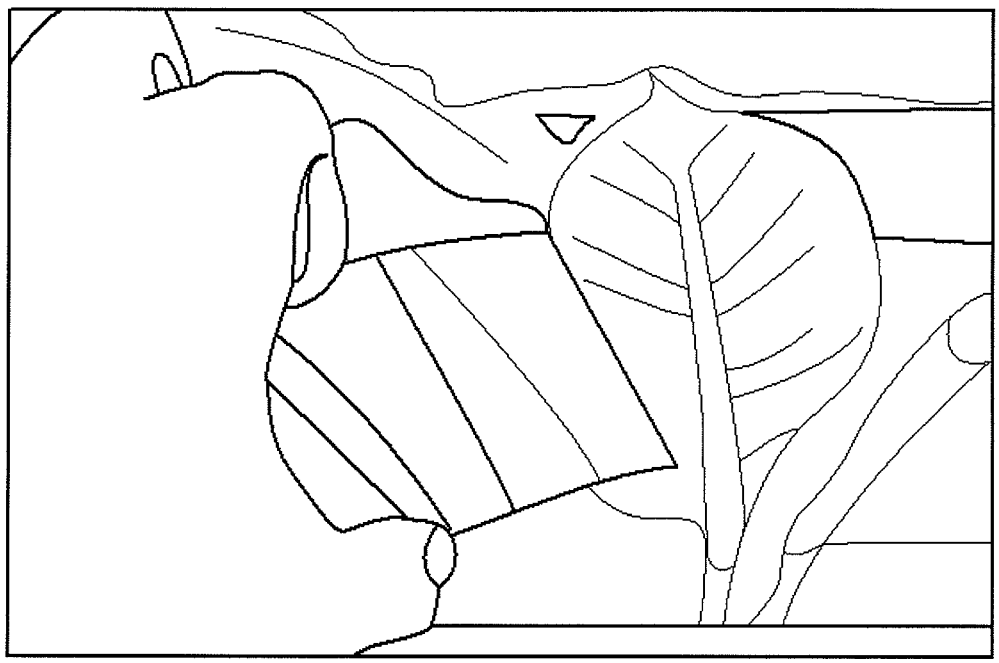
FIG. 11 shows a PI film patterned according to the invention (focal extent of the laser beam in the first spatial direction: 30 µm, extent of the laser beam in the second spatial direction: 70 mm).

The exemplary embodiment shown in FIG. 8 is identical to the exemplary embodiment shown in FIG. 7, but uses at the location of the two concave cylindrical lenses 6a and 6b two identically designed convex cylindrical lenses (the longitudinal axis of which likewise points in the y-direction). Consequently, the expansion in the second spatial direction x is achieved here by means of a short focal length $f_{cyl}$ of the two cylindrical lenses 6a and 6b, that is to say by means of a firstly high level of focusing and then renewed defocusing of the two partial beam paths L1 and L2 in the plane perpendicular to the first spatial direction y. If the distance between the sample P and the two cylindrical lenses 6a and 6b is chosen to be very much greater (e.g. a factor of 10 to 20) than the focal length $f_{cyl}$, then this results in a considerable additional (in comparison with the expansion in the telescope 9, which is embodied here, in the same way as in FIG. 7 and as a further difference with respect to the construction in FIG. 2, as in the variant shown in FIG. 5) expansion in the second spatial direction x.

In comparison with the ninth and tenth exemplary embodiments, exemplary embodiments 1 to 7 in FIGS. 2 to 6 have the advantage of simpler alignment: in the case of FIGS. 7 and 8, the two cylindrical lenses 6a and 6b have to be coordinated with one another very precisely in order to cause the partial beams to overlap in a parallel fashion in the overlap region 5. By contrast, the exemplary embodiments shown in FIGS. 1 to 5 also allow slight deviations when setting up the optical elements 6, 7 and 8 without a serious effect on the desired parallel overlapping in the interference region 5.

In all embodiments shown in FIGS. 2 to 8, it is possible to use further optical elements, such as polarizers, for example, for optimizing the beam guiding or for further adaptation of the patterning. By way of example, beam homogenizers can be used directly upstream of the elements 11 and/or 2.

FIG. 9a shows examples a) to d) of interference structures which can be applied to the surface to be processed by means of a pulsed laser according to the invention in the constructions from FIGS. 2 to 4b and 5 to 8. In accordance with the formula shown in FIG. 9a, the period a of the interference structures, that is to say the spacing of adjacent lines of the interference structure, is dependent only on the wavelength of the laser light 1 and on the interference angle Θ (cf. e.g. FIG. 2) between the two partial beams L1 and L2 incident on the sample surface P. As shown in FIG. 9a, according to the invention it is possible to achieve periods a in the nm to μm range, focus extents in the first spatial direction y in the μm to mm range and processing extents in the second spatial direction x or w of up to 20 to 40 cm, cf. FIG. 9a-a). A smaller focus extent (down to 0.01 cm) in this direction is also conceivable.

As shown by the examples in FIGS. 9a-b) and 9a-c), by means of a suitable choice of the advance of the sample P e.g. in the y-direction (cf. FIG. 10) or else only in the x-direction or both in the x-direction and in the y-direction, on the one hand, and, adapted thereto, a pulse frequency of the individual laser pulses, on the other hand, it is possible either (FIG. 9a-b)) to generate two-dimensional interference structures (increased pulse frequency in comparison with the sample advance leads to an increased distance between adjacent interference structures by means of two successive pulses in the y-direction) or else (FIG. 9a-c)) to generate one-dimensional interference structures which arise as a result of the overlap of the interference structures of temporally adjacent pulses in the y-direction as a result of a suitable reduction of the transport speed in the y-direction. (In FIG. 9a-b), the distance d1 between the structures of successive laser pulses is greater than the extent of the structures in the focusing direction y; in FIG. 9a-c), the opposite applies to the distance d2.)

As shown in FIG. 9a-d), an interference pattern offset in the second spatial direction x can be generated by means of a sample advance having an additional component in the second spatial direction x. Here $d_y$ (like d1 and d2 as well) denotes the distance between adjacent structures in the y-direction, and $d_x$ denotes the additional offset of two adjacent interference structures in the x-direction.

FIG. 9b shows the interference structures which can be realized with the construction from FIG. 4c. As shown in the figure, in contrast to FIG. 9a (where the individual intensity maxima in each case run parallel to the first spatial direction y and are arranged alongside one another in the direction of the second spatial direction x or w) the individual intensity maxima here run along the second spatial direction x, that is to say the expanding direction (and therefore have a very much wider extent than the individual intensity maxima shown in FIG. 9a) and are arranged alongside one another in the direction of the first spatial direction y (consequently, in FIG. 9b the first spatial direction y is the direction of the periodicity of the individual maxima, whereas in FIG. 9a the periodicity direction is the second spatial direction x). In the case shown in FIGS. 4c and 9b, too, the following arises quantitatively for the period $a=\lambda/(2 \sin(\Theta/2))$.

As shown in FIG. 10a), with the aid of a conveyor belt 10, merely indicated here, the sample P lying on said belt can be transported in the y-direction in order that the one- or two-dimensional interference pattern can be introduced by patterning depending on the transport speed. FIG. 10b) indicates that the sample P can also be arranged on a rotating roller for patterning. Finally, FIG. 10c) shows that the advance in the y-direction can also be effected by means of a roll-to-roll transport apparatus. Large components can be patterned rapidly in the manner shown.

The invention claimed is:

1. Apparatus for the interference patterning of a planar sample (P) comprising
a laser (1) for emitting a laser beam along a beam path,
a focusing arrangement (2) positioned in the beam path of the laser (1), for imaging the laser beam (L) in a first spatial direction (y) in a focused manner into a sample volume (3) in which the planar sample (P) is positioned,
an expanding and splitting arrangement (4) positioned downstream of the focusing arrangement (2) in the beam path, wherein the laser beam (L) is expanded in a second spatial direction (x, w), which is not parallel to the first spatial direction (y), and is split into two partial beams (L1, L2) and the two partial beams (L1, L2) is directed onto the sample volume (3) such that the two partial beams (L1, L2) interfere within the sample volume (3) in an interference region (5),
wherein the expanding and splitting arrangement (4) includes a first optical element comprising a cylindrical lens (6) for expanding the laser beam in the second spatial direction (x, w), and includes a second optical element comprising a beam splitter (7) for splitting the laser beam (L) into the two partial beams (L1, L2), and further includes a plurality of third optical element(s) comprising a plurality of reflection elements (8a, 8b, 8c), to direct the two partial beams (L1, L2) onto the sample volume (3) such that the two partial beams interfere within the sample volume (3) in the interference region (5),
wherein the first optical element images the beam path (L) onto a beam splitter (7), wherein a focal length $f_{cyl}$ of the cylindrical lens (6) is less than a distance in the beam path (L, L1, L2) between the cylindrical lens (6) and the beam splitter (7) and also the distance in the beam path (L, L1, L2) between the cylindrical lens (6), on the one hand, and the location of a focus (F) in the sample volume (3) in the first spatial direction (y), on the other hand, is greater than said focal length $f_{cyl}$ of the cylindrical lens (6) by more than a factor not less than between a factor 2 and a factor 10.

2. Apparatus for the interference patterning of a planar sample (P) comprising a laser (1) for emitting a laser beam along a beam path,
a focusing arrangement (2) positioned in the beam path of the laser (1), for imaging the laser beam (L) in a first spatial direction (y) in a focused manner into a sample volume (3) in which the planar sample (P) is positioned,
an expanding and splitting arrangement (4) positioned downstream of the focusing arrangement (2) in the beam path, wherein the laser beam (L) is expanded in a second spatial direction (x, w), which is not parallel to the first spatial direction (y), and is split into two partial beams (L1, L2) and the two partial beams (L1, L2) is directed onto the sample volume (3) such that the two partial beams (L1, L2) interfere within the sample volume (3) in an interference region (5),
wherein the expanding and splitting arrangement (4) includes a first optical element comprising a cylindrical lens (6) for expanding the laser beam in the second spatial direction (x, w), and includes a second optical element comprising a beam splitter (7) for splitting the laser beam (L) into the two partial beams (L1, L2), and further includes a plurality of third optical element(s) comprising a plurality of reflection elements (8a, 8b, 8c), to direct the two partial beams (L1, L2) onto the sample volume (3) such that the two partial beams interfere within the sample volume (3) in the interference region (5),
wherein the first optical element images the beam path (L) onto the beam splitter (7), wherein a focal length $f_{cyl}$ of the cylindrical lens (6) is greater than a distance in the beam path (L, L1, L2) between the cylindrical lens (6) and the beam splitter (7) and also a distance $d_{cyl\text{-}foc}$ in the beam path (L, L1, L2) between the cylindrical lens (6), on the one hand, and the location of a focus (F) in the sample volume (3) in the first spatial direction (y), on the other hand, is greater than a focal length $f_{cyl}$ of the cylindrical lens (6) by more than a factor not less than between a factor 2 and a factor 10.

3. Apparatus according to claim 1,
wherein said first optical element comprises a concave cylindrical lens (6) for the expanding imaging of the beam path (L) onto the beam splitter (7).

4. Apparatus for the interference patterning of a planar sample (P) comprising a laser (1) for emitting a laser beam along a beam path,
a focusing arrangement (2) positioned in the beam path of the laser (1), for imaging the laser beam (L) in a first spatial direction (y) in a focused manner into a sample volume (3) in which the planar sample (P) is positioned,
an expanding and splitting arrangement (4) positioned downstream of the focusing arrangement (2) in the beam path, wherein the laser beam (L) is expanded in a second spatial direction (x, w), which is not parallel to the first spatial direction (y), and is split into two partial beams (L1, L2) and the two partial beams (L1, L2) is directed onto the sample volume (3) such that the two partial beams (L1, L2) interfere within the sample volume (3) in an interference region (5),
wherein the expanding and splitting arrangement (4) includes a first optical element comprising a beam splitter (7) for splitting the laser beam (L) into said two partial beams (L1, L2), and further includes a plurality of second optical element(s) comprising a plurality of reflection elements (8a, 8b, 8c) to direct the two partial beams (L1, L2) onto the sample volume (3) such that the two partial beams interfere within the sample volume (3) in the interference region (5), and further includes two third optical elements comprising two cylindrical lenses (6a, 6b) for bringing about the expanding in the second spatial direction (x, w) in each of the two partial beams (L1, L2),
wherein said two third optical elements are identically embodied cylindrical lenses (6a, 6b) each of which image one of said two partial beams (L1, L2) into the sample volume (3), and for each of said cylindrical lenses (6a, 6b) a focal length $f_{cyl}$ is less than the distance in the respective partial beam path (L1, L2) between the respective cylindrical lens (6a, 6b), on the one hand, and the location of the focus (F) in the sample volume (3) in the first spatial direction (y), on the other hand, by more than a factor not less than between a factor 2 and a factor 10.

5. Apparatus according to claim 4,
wherein two third optical elements are identically embodied concave cylindrical lenses (6a, 6b) which in each case image one of the two partial beams (L1, L2) into the sample volume (3).

6. Apparatus according to claim 1,
wherein a movement unit (10) comprises one of a conveyor belt and a roller-based transport apparatus for moving the sample (P) within the sample volume (3) in the first spatial direction (y),
and wherein
the focusing arrangement (2) and the expanding and splitting arrangement (4) deflect the laser beam (L) and the two partial beams (L1, L2) originating therefrom relative to the planar sample (P).

7. Apparatus according to claim 1, wherein said laser is an Nd:YAG-Laser having a wavelength of 355 nm, and has an energy per laser pulse of between 1 nJ and 50 J, a pulse frequency of between 1 Hz and 500 MHz and a pulse half-width of between 1 fs and 100 ms.

8. Apparatus according to claim 1, wherein said first optical element comprises a convex cylindrical lens.

9. Apparatus according to claim 4, wherein said third optical elements are convex cylindrical lenses.

10. Apparatus according to claim 1, wherein
the focusing arrangement (2) is a beam-cross-section-altering focusing arrangement (9) for expanding said laser beam (L) relative to a cross section of said laser beam.

11. Apparatus according to claim 10,
wherein the laser beam (L) is expanded in two spatial directions which are not parallel to one another, wherein these two spatial directions are in the first spatial direction (y), and the second spatial direction (x,w).

12. Apparatus according to claim 1,
wherein said expanding and splitting arrangement (4) includes three reflection elements (8a, 8b, 8c) comprising plane mirrors, to direct the two partial beams (L1, L2) onto the sample volume (3) such that said beams interfere within the sample volume (3) in the interference region (5).

13. Apparatus according to claim 1, wherein
the focusing arrangement (2) is one of
a beam-cross-section-altering focusing arrangement (9) comprising a beam expander for altering the laser beam cross section,
and a focusing arrangement which does not alter the beam cross section and which comprises at least one converging lens (12).

* * * * *